United States Patent
McLoughlin et al.

(10) Patent No.: US 6,971,043 B2
(45) Date of Patent: Nov. 29, 2005

(54) APPARATUS AND METHOD FOR ACCESSING A MASS STORAGE DEVICE IN A FAULT-TOLERANT SERVER

(75) Inventors: Michael McLoughlin, Glasnevin (IE); Gerry Griffin, Stillorgan (IE)

(73) Assignee: Stratus Technologies Bermuda LTD, Hamilton (BM)

( * ) Notice: Subject to any disclaimer, the term of this patent is extended or adjusted under 35 U.S.C. 154(b) by 828 days.

(21) Appl. No.: 09/832,467

(22) Filed: Apr. 11, 2001

(65) Prior Publication Data

US 2002/0152419 A1    Oct. 17, 2002

(51) Int. Cl.$^7$ ............................................. G06F 11/00
(52) U.S. Cl. ............................ 714/11; 714/10; 714/6; 712/10
(58) Field of Search ................ 714/11, 6, 10; 712/10, 11; 710/21

(56) References Cited

U.S. PATENT DOCUMENTS

| | | | |
|---|---|---|---|
| 3,544,973 A | 12/1970 | Borck, Jr. et al. ............ 712/13 |
| 3,548,382 A | 12/1970 | Lichty et al. ................ 710/317 |
| 3,560,935 A | 2/1971 | Beers .......................... 710/262 |
| 3,641,505 A | 2/1972 | Artz et al. ................... 710/100 |
| 3,688,274 A | 8/1972 | Cormier et al. ................ 710/5 |
| 3,710,324 A | 1/1973 | Cohen et al. ................. 710/40 |
| 3,805,039 A | 4/1974 | Stiffler ........................... 714/3 |
| 3,893,084 A | 7/1975 | Kotok et al. ................. 711/166 |
| 3,895,353 A | 7/1975 | Dalton ........................ 710/263 |
| 3,909,799 A | 9/1975 | Recks et al. ................. 712/234 |
| 3,925,766 A | 12/1975 | Bardotti et al. ............. 710/244 |
| 3,984,814 A | 10/1976 | Bailey, Jr. et al. ............ 714/16 |
| 4,001,783 A | 1/1977 | Monahan et al. ........... 710/264 |
| 4,059,736 A | 11/1977 | Perucca et al. ............. 370/250 |
| 4,099,234 A * | 7/1978 | Woods et al. ................. 714/11 |
| 4,228,496 A | 10/1980 | Katzman et al. ............ 710/100 |
| 4,253,147 A | 2/1981 | MacDougall et al. ....... 711/169 |
| 4,257,095 A | 3/1981 | Nadir .......................... 710/119 |
| 4,366,535 A | 12/1982 | Cedolin et al. ............. 710/100 |
| 4,371,932 A | 2/1983 | Dinwiddie, Jr. et al. ...... 710/21 |
| 4,428,044 A | 1/1984 | Liron .......................... 714/12 |
| 4,449,182 A | 5/1984 | Rubinson et al. ............. 710/62 |
| 4,484,273 A | 11/1984 | Stiffler et al. ............... 710/110 |
| 4,484,275 A | 11/1984 | Katzman et al. .............. 710/40 |
| 4,638,432 A | 1/1987 | Niblock et al. ............. 710/260 |
| 4,703,420 A | 10/1987 | Irwin ......................... 710/113 |
| 4,716,523 A | 12/1987 | Burrus, Jr. et al. ........... 710/28 |
| 4,807,117 A | 2/1989 | Itoku et al. ................. 710/264 |
| 4,914,580 A | 4/1990 | Jensen et al. ............... 710/265 |
| 4,918,599 A | 4/1990 | Hashimoto et al. ......... 710/265 |
| 4,931,922 A | 6/1990 | Baty et al. ...................... 714/9 |
| 4,942,517 A | 7/1990 | Cok ............................. 712/11 |

(Continued)

FOREIGN PATENT DOCUMENTS

EP        0 009 678 A1    4/1980

(Continued)

*Primary Examiner*—Robert Beausoliel
*Assistant Examiner*—Christopher McCarthy
(74) *Attorney, Agent, or Firm*—Kirkpatrick & Lockhart Nicholson Graham LLP

(57) ABSTRACT

An apparatus and method for accessing a first local mass storage device or a second local mass storage device in a fault-tolerant server. In one embodiment, the fault-tolerant server establishes communication between a first computing element and a first local mass storage device. The fault-tolerant server also establishes communications between a second computing element and a second local mass storage device. In one embodiment, the first computing element and the second computing element issue substantially similar instruction streams to one of the local mass storage devices.

21 Claims, 10 Drawing Sheets

U.S. PATENT DOCUMENTS

| | | | | |
|---|---|---|---|---|
| 4,942,519 | A | 7/1990 | Nakayama | 710/269 |
| 4,987,530 | A | 1/1991 | Wagner et al. | 710/1 |
| 4,994,960 | A | 2/1991 | Tuchler et al. | 710/269 |
| 5,101,497 | A | 3/1992 | Culley et al. | 710/261 |
| 5,157,663 | A | 10/1992 | Major et al. | 714/10 |
| 5,237,662 | A | 8/1993 | Green et al. | 718/100 |
| 5,249,187 | A * | 9/1993 | Bruckert et al. | 714/11 |
| 5,257,383 | A | 10/1993 | Lamb | 710/260 |
| 5,276,823 | A | 1/1994 | Cutts, Jr. et al. | 714/11 |
| 5,295,258 | A | 3/1994 | Jewett et al. | 714/12 |
| 5,357,615 | A | 10/1994 | Peek et al. | 710/3 |
| 5,363,503 | A | 11/1994 | Gleeson | 714/10 |
| 5,367,668 | A | 11/1994 | Pandolfo | 714/12 |
| 5,812,757 | A * | 9/1998 | Okamoto et al. | 714/11 |
| 5,826,095 | A * | 10/1998 | Jordan | 712/11 |
| 5,890,003 | A * | 3/1999 | Cutts et al. | 710/263 |
| 6,032,265 | A | 2/2000 | Oguro et al. | 714/9 |
| 6,134,596 | A | 10/2000 | Bolosky et al. | 709/233 |
| 6,141,769 | A * | 10/2000 | Petivan et al. | 714/10 |
| 6,263,452 | B1 * | 7/2001 | Jewett et al. | 714/9 |
| 6,687,851 | B1 * | 2/2004 | Somers et al. | 714/12 |
| 6,772,368 | B2 * | 8/2004 | Dhong et al. | 714/11 |
| 6,820,213 | B1 * | 11/2004 | Somers et al. | 714/11 |
| 6,862,693 | B2 * | 3/2005 | Chaudhry et al. | 714/11 |
| 2002/0144175 | A1 * | 10/2002 | Long et al. | 714/11 |
| 2002/0152418 | A1 * | 10/2002 | Griffin et al. | 714/11 |
| 2002/0152420 | A1 * | 10/2002 | Chaughry et al. | 714/11 |

FOREIGN PATENT DOCUMENTS

| | | |
|---|---|---|
| EP | 0 208 430 A1 | 1/1987 |
| EP | 0 301 499 A2 | 2/1989 |
| EP | 0 355 856 A1 | 2/1989 |
| EP | 0 390 567 A1 | 10/1990 |
| EP | 0 475 005 A2 | 3/1992 |
| EP | 0 293 860 B1 | 2/1996 |

* cited by examiner

APPARATUS AND METHOD FOR ACCESSING A MASS STORAGE DEVICE IN A FAULT-TOLERANT SERVER

FIELD OF THE INVENTION

The present invention relates generally to computer systems and more specifically to a method and apparatus for accessing a mass storage device in a fault-tolerant server.

BACKGROUND OF THE INVENTION

Over the past decade, the use of computers and related technology has increased tremendously. In particular, computers often support air traffic control systems, banking systems, and mission critical defense systems, such as computer systems controlling the launch and flight of defense missiles. Deployed in such a ubiquitous manner, the computers can cause severe problems in the functioning of society if any were to fail. Because of the potential for far-reaching adverse effects in the event of failure, computers are being required to ensure ever-higher reliability. Fault-tolerant computers are computers that generally provide this reliability aspect in such systems.

Further, the strains on servers today and the applications they support have never been greater. Fault-tolerant servers are currently being used to minimize the effects of these strains, such as the failed execution of a client request. Typically, a fault-tolerant server includes one or more redundant central processor units (CPUs) and one or more redundant input-output (I/O) boards, or subsystems. The I/O subsystems interface with one or more I/O devices, such as mass storage devices. These mass storage devices are frequently mirrored (i.e., the same data is stored on all of the redundant mass storage devices) to enable a first mass storage device to replace a second mass storage device upon a failure of the second mass storage device.

However, if a mass storage device fails, a CPU cannot access the mirrored mass storage device using the I/O subsystem associated with the failed mass storage device. In other words, the CPU can only access the mirrored mass storage device through an independent I/O subsystem. Thus, upon a failure of a mass storage device, the I/O subsystem associated with the failed mass storage device is replaced by a redundant I/O subsystem to prevent loss of data. The replacement of an I/O subsystem upon the failure of a mass storage device is often burdensome and wasteful of resources of the fault-tolerant server.

Thus, there remains a need to access a mass storage device that is associated with an independent I/O subsystem.

SUMMARY OF THE INVENTION

The present invention relates to apparatus and methods for accessing mass storage devices that are local to a computing element of a fault-tolerant server. In a first aspect, the invention comprises a first computing element and a second computing element and each communicates with a communications link. The first computing element also communicates with a first mass storage device local to the first computing element. Similarly, the second computing element communicates with a second mass storage device local to the second computing element. The first computing element and the second computing element issue substantially similar instruction streams to one of the local mass storage devices.

In one embodiment, each computing element includes a central processing unit (CPU) that communicates with a respective local input-output (I/O) subsystem. Further, the communications link comprises a switching fabric that communicates with the respective CPU and both of the respective I/O subsystems. The switching fabric communicates with the I/O subsystem on the opposite computing element over a backplane link and a backplane.

In another aspect, the invention consists of a method for accessing a local mass storage device in a fault-tolerant server. The method includes the step of establishing communication between a first computing element and a first local mass storage device. The method further includes the step of establishing communication between a second computing element and a second local mass storage device. The first computing element and the second computing element issue substantially similar instruction streams to one of the local mass storage devices.

In one embodiment, the first computing element and the second computing element execute in lockstep operation. In a further embodiment, the method stores a datum in the first local mass storage device. Mirroring software can then store the datum in the second local mass storage device.

BRIEF DESCRIPTION OF THE DRAWINGS

The invention is pointed out with particularity in the appended claims. The drawings are not necessarily to scale, emphasis instead generally being placed upon illustrating the principles of the invention. Like reference characters in the respective drawing figures indicate corresponding parts. The advantages of the invention may be better understood by referring to the following description taken in conjunction with the accompanying drawings in which:

DETAILED DESCRIPTION OF THE INVENTION

Figure 1:
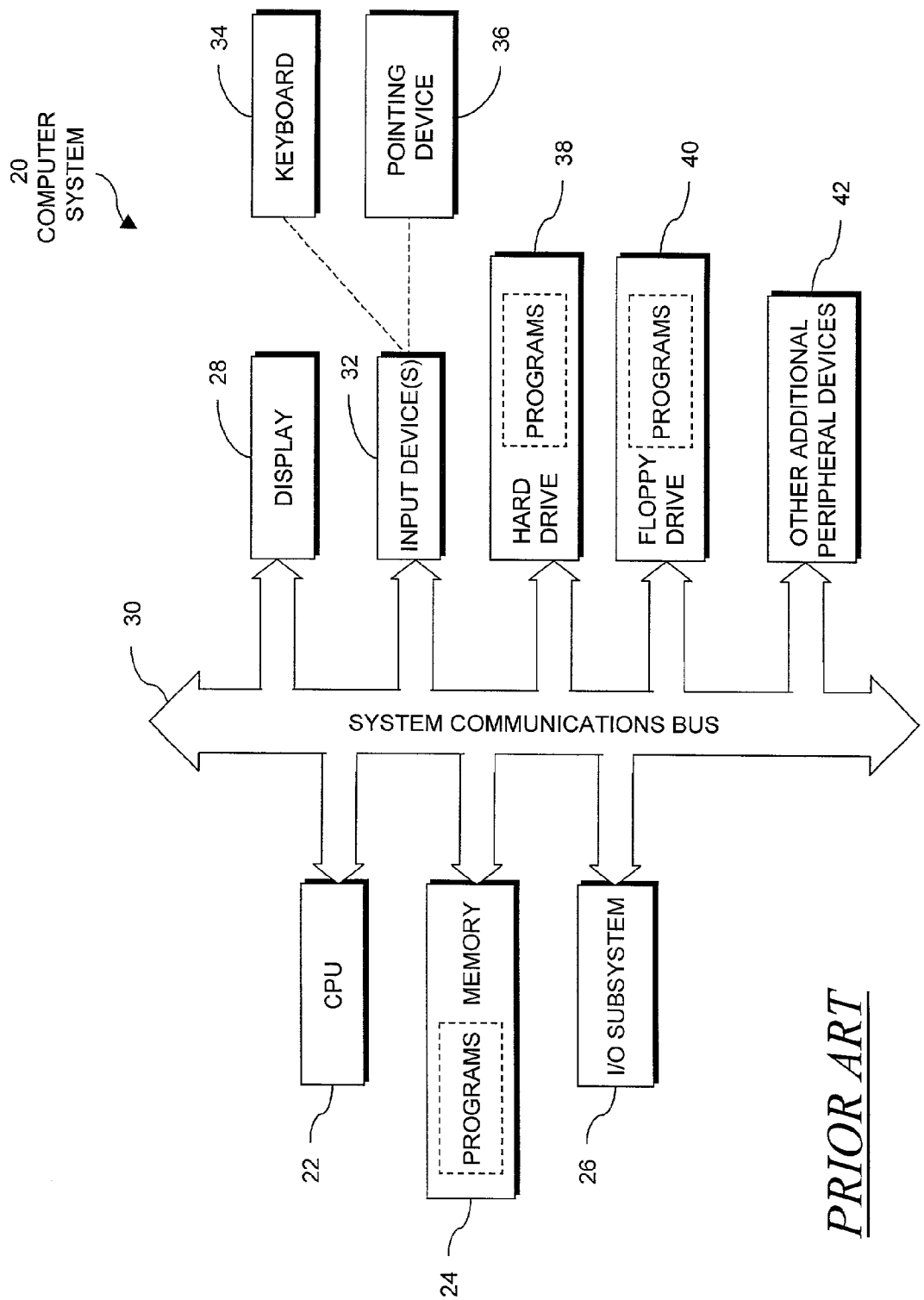
FIG. 1 is a block diagram of a prior art computer system.

Referring now to FIG. 1, a typical computer system 20, such as a server, as known in the prior art includes a central processor unit (CPU) 22, a main memory unit 24 for storing programs and/or data, an input/output (I/O) subsystem 26, a display device 28, and a system communications bus 30 coupling these components to allow communication between these units. The memory 24 may include random access memory (RAM), read only memory (ROM), and one or more memory registers. The computer system 20 typically also has one or more peripheral devices, such as input devices 32. For example, the computer system 20 may include a keyboard 34 (e.g., an alphanumeric keyboard and/or other types of keyboards such as a reduced-key keyboard, or a musical keyboard) and a computer pointing device 36 for translating user movements into computer gestures (e.g., a mouse, a track ball, a track pad, a digitizing tablet, a joystick, a data glove).

The computer system 20 typically also includes one or more mass storage devices, such as a hard disk drive 38 and a floppy disk drive 40 for receiving floppy disks such as 3.5-inch disks. Other additional peripheral devices 42 also can be part of the computer system 20 including output devices (e.g., printer or plotter) and/or optical disk drives for receiving, reading, and/or writing digital data on a CD-ROM. In the disclosed embodiment, one or more computer programs shown in phantom define the operational capabilities of the computer system 20. These programs can be loaded onto the hard disk drive 38 and/or into the main memory 24 of the computer CPU 22 via the floppy disk drive 40. A user of the computer system 20 may execute these applications by using the computer-pointing device 36 to double-click on an icon related to the applications. In general, one or more of the computer system's mass storage devices, such as the hard disk drive 38 or the other additional peripheral devices 42 (e.g., a CD-ROM 42), stores the controlling software program(s) and all of the data utilized by the program(s).

The system communications bus 30 allows data to be transferred between the various components in the computer system 20. For example, the CPU 22 may retrieve program data from the main memory 24 over the system communications bus 30. Various system busses 30 are standard in computer systems 20, such as the Video Electronics Standards Association (VESA) Local Bus, the industry standard architecture (ISA) bus, the Extended Industry Standard Architecture bus (EISA), the Micro Channel Architecture bus (MCA) and a Peripheral Component Interconnect (PCI) bus. In some computer systems 20, multiple system communication busses 30 may be used to provide access to different units of the system 20. For example, a computer system 20 may use a PCI bus to connect a CPU 22 to peripheral devices 28, 34, 36, 38, 40, 42 and concurrently to connect the CPU 22 to main memory 24 using an MCA bus. Other embodiments include a system bus 30 comprised of other bus architectures, or combination of bus architectures, such as an Accelerated Graphics Port (AGP) bus, a Small Computer System Interface (SCSI) bus, a Universal Serial Bus (USB), a Personal Computer Memory Card Industry Association (PCMCIA) bus, a NuBus, a TURBOchannel bus, a Multibus, a STD bus, or a Versa Module Europa (VME) bus.

It is immediately apparent from FIG. 1 that such a traditional computer system 20 is highly sensitive to any single point of failure. For example, if the main memory unit 24 fails to operate for any reason, the computer system 20 as a whole will cease to function. Similarly, should the system communications bus 30 fail, the computer system 20 as a whole will fail. A redundant, fault-tolerant system achieves an extremely high level of availability by using redundant components and data paths to insure uninterrupted operation. A redundant, fault-tolerant system may be provided with any number of redundant components. Some configurations include dual-mode redundant (DMR) systems, which include duplicates of certain hardware units found in FIG. 1, for example, duplicate, redundant CPUs 22 and main memory units 24 executing substantially identical instruction streams. Other configurations include triple-mode redundant (TMR) configurations, which include three of each of certain hardware units shown in FIG. 1, for example three redundant CPUs 22 and main memory units 24 executing substantially identical instruction streams. Yet other configurations are possible with even higher-level redundancies.

Figure 2:
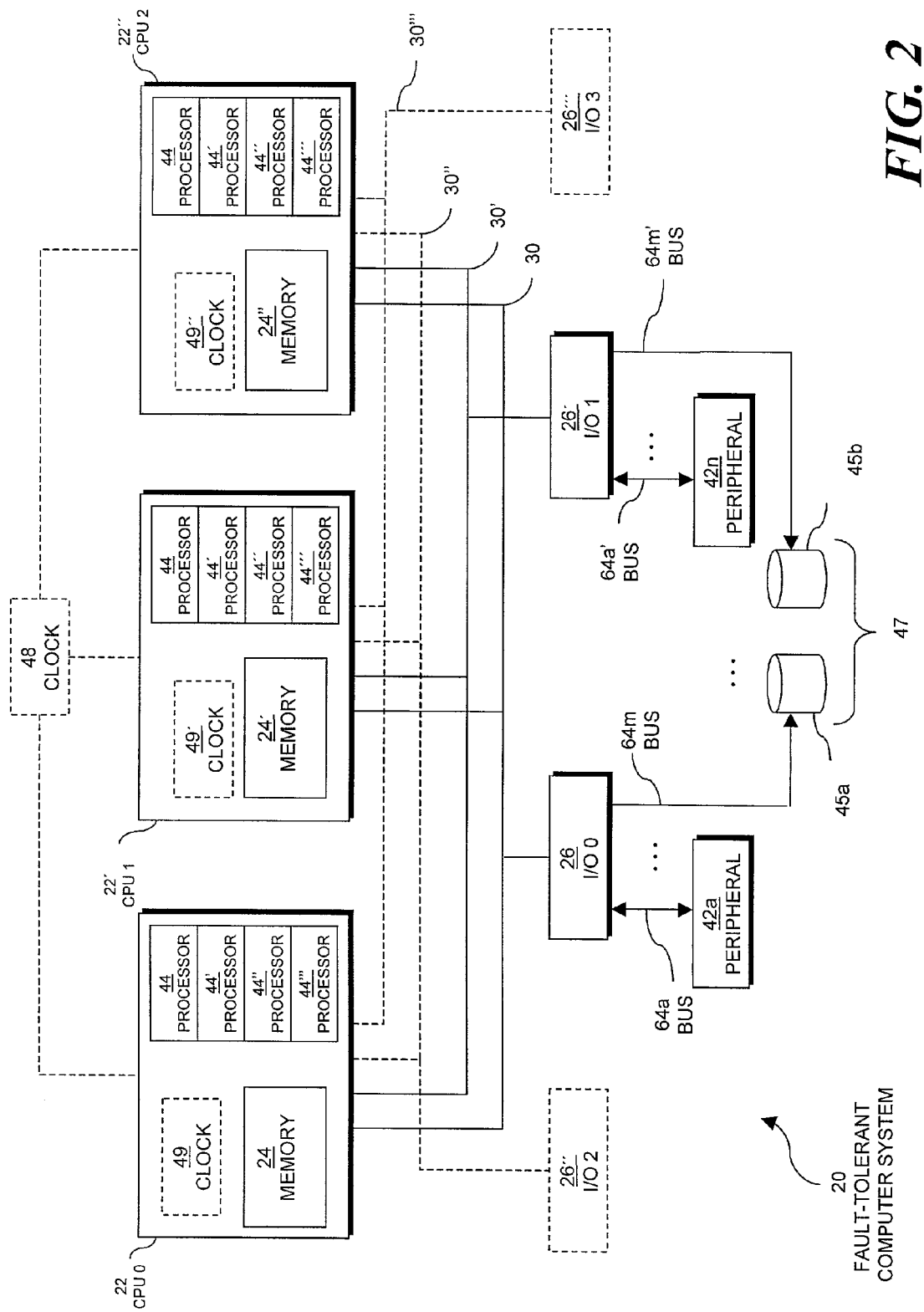
FIG. 2 is a block diagram of an embodiment of a fault-tolerant computer system.

In brief overview, referring now to FIG. 2, one embodiment of a TMR, fault-tolerant computer system 20 is shown that includes three CPU boards 22, 22', 22" (generally 22), at least two I/O subsystems 26, 26', 26", 26''' (generally 26), redundant communications busses 30, 30', 30", 30''' (generally 30), one or more first peripheral busses 64a through 64m (generally 64), and one or more peripheral devices 42a through 42n (generally 42).

Each of the CPU boards 22 communicates with the first I/O subsystem 26 through the first communications bus 30. Each of the CPU boards 22 communicates with the second I/O subsystem 26' through the second, redundant communications bus 30'. In some embodiments, the CPU board 22 is a module, or chassis, while in yet other embodiments the CPU board 22 is a single chip.

In some embodiments, the system communication busses 30 are standard system busses such as those described for the computer system 20 illustrated in FIG. 1 (ISA, VESA, EISA, MCA, PCI, and the like). Examples of peripheral devices 42 include the peripheral devices previously identified in FIG. 1, e.g., a display device (e.g., a monitor), a hard disk drive, a CD ROM drive, one or more input device(s) (e.g., a keyboard or a computer pointing device), a printer, a plotter, and a floppy disk drive 40.

In another embodiment, the fault-tolerant computer system 20 includes more than two I/O subsystems (e.g., 26" and 26''' shown in phantom view) to allow the fault-tolerant computer system 20 to control additional peripheral devices 42. The additional I/O subsystems 26", 26''' are similarly in communication with the CPU boards 22 through additional communication busses 30" and 30''', also shown in phantom.

In one embodiment, the CPU boards 22 are redundant CPU boards 22 executing substantially identical instruction streams. By executing substantially identical instruction streams, the CPU boards 22 are configured in a "failover" mode. That is, at any instant in time, one CPU board 22, e.g., the second CPU board 22', remains ready to replace the first CPU board 22 upon a failure of the first CPU board 22. As a consequence of the replacement, the second CPU board 22' experiences no loss of data, as the second CPU board 22' operates in place of the first CPU board 22.

Similarly, the I/O subsystems 26 are redundant components configured in failover mode. That is, at any instant in time, I/O communications between the CPU boards 22 and the peripheral devices 42 are communicated through one of the I/O subsystems 26, e.g., the first I/O subsystem 26, but are not simultaneously communicated through the second I/O subsystem 26'. The second, I/O subsystem 26' remains ready to replace the first I/O subsystem 26 in the event of a failure. Failover of the I/O subsystems 26 is controlled by fault-tolerant control elements discussed later in more detail.

In one embodiment and as shown in FIG. 2, each I/O subsystems 26 communicates with a mass storage device 45a, 45b (generally 45). Each mass storage device 45 can be grouped with another mass storage device 45 to form a pair of devices 47, such as a pair of disks. To ensure integrity of the data that the fault-tolerant computer system 20 stores in one of the mass storage devices (e.g., 45a), the fault-tolerant computer system 20 simultaneously writes the data to another mass storage device (e.g., 45b). This process is known to those skilled in the art as "disk mirroring". The mirroring of the data enables the fault-tolerant computer system 20 to access the same data from the second mass storage device 45b following a failure of the first mass storage device 45a, and vice-versa.

For example, a mass storage device 45 may be, without limitation, a hard disk, CD-ROM, magnetic disk, or magneto-optical drive. In one embodiment, the pair of mass storage devices 45 are part of a redundant array of independent disks (RAID arrays) used as failure-tolerant persistent mass storage. The fault-tolerant computer system 20 processes each write transaction to the mass storage devices 45 in parallel, writing it to each device 45 in the array. If the computer system 20 fails, then the mass storage device 45 with the most accurate set of contents available can be used as a master, copying all its contents to the other devices 45 in the array (RAID level 1). Another solution not only stores one copy of the transaction information across multiple mass storage devices 45, but also stores parity information concerning the transaction data (RAID level 5). In another embodiment, the mass storage devices 45 are Fibre Channel disks. In yet another embodiment, the mass storage devices 45 are a group of disks.

Frequently, only one I/O subsystem 26 has access to a particular mass storage device 45. Consequently, upon a failure of a particular mass storage device 45, the I/O subsystem 26 associated with that mass storage device 45 can no longer access the data previously stored on the failed mass storage device 45. Similarly, the I/O subsystem 26 associated with the failed mass storage device 45a cannot access the mirrored mass storage device 45b because the mirrored mass storage device 45b is associated with an independent I/O subsystem 26'. Thus, upon a failure of a mass storage device 45a, the I/O subsystem 26 associated with the failed mass storage device 45 is replaced by a redundant I/O subsystem 26' to prevent loss of data (i.e., failover). For example, a failure of the first mass storage device 45a causes the first CPU board 22 to connect to the redundant, second I/O subsystem 26' through bus 30'.

In more detail and in one embodiment, each CPU board 22 contains at least one processor 44 and the main memory 24. In some embodiments, each CPU board 22 contains multiple processors 44, 44', 44", and 44'" (generally 44). In multi-processor embodiments, each of the multiple processors 44 of a CPU board 22 (e.g., processor 44 and 44' of CPU board 22) may process different instruction streams. Respective processors 44 on different CPU boards 22 (e.g., processor 44 on CPU board 22 and processor 44 on CPU board 22') execute substantially identical instruction streams. In one embodiment, the processors 44 are selected from the "x86" family of processors manufactured by Intel Corporation of Santa Clara, Calif. The x86 family of processors includes the 80286 processor, the 80386 processor, the 80486 processor, and the Pentium®, Pentium® II, Pentium® III, Pentium® III Xeon™, Pentium IV processors, and the 64-bit Itanium™ family of processors. In another embodiment, the processors 44 are selected from the "680x0" family of processors manufactured by Motorola Corporation of Schaumburg, Ill. The 680x0 family of processors includes the 68000, 68020, 68030, and 68040 processors. Other processor families include the Power PC line of processors manufactured by Motorola Corporation, the Alpha line of processors manufactured by Compaq Corporation of Houston, Tex., and the Crusoe line of processors manufactured by Transmeta Corporation of Santa Clara, Calif. In yet another embodiment, the processor 44 is an Athalon processor, manufactured by Advanced Micro Devices (AMD) of Sunnyvale, Calif.

In one embodiment, the redundant CPU boards 22 execute in "lockstep," that is, each CPU board 22 executes substantially identical copies of the operating system and application programs, substantially simultaneously, in cycle-by-cycle synchronism. In lockstep operation, the replicated CPU boards 22 store identical data in the replicated main memory 24 at all times. In some embodiments of a lockstep fault-tolerant computer system 20, a single reference clock source 48 (shown in phantom) is provided in communication with each of the CPU boards 22, and each of the CPU boards 22 synchronizes to the common clock source 48.

In other embodiments generally well known to those skilled in the art, the redundant CPU boards 22 execute identical operating systems and application programs and execute substantially equivalent instruction streams in a loosely synchronized, or "loose-stepped" manner. In a loose-step fault-tolerant computer system 20, each of the CPU boards 22 can include its own clock source 49, 49', 49" (generally 49) shown in phantom in FIG. 2, running asynchronously with respect to the clock sources 49 of the other CPU boards 22. Loose-step synchronization does not require the common clock source 48 used for lock-step embodiments.

In some embodiments of a loose-step fault-tolerant computer system 20, the CPU boards 22 maintain synchronization of the fault-tolerant computer system 20 by counting the instructions processed and initiating a synchronizing procedure after counting some quantum of the instructions. In other embodiments, the CPU boards 22 maintain synchronization of the fault-tolerant computer system 20 by monitoring events, such as memory references. In these embodiments any of the CPU boards 22 performing a monitored event before the remainder of the loose-stepped CPU boards 22 is stalled. Once the remainder of the CPU boards 22 perform the monitored event, the stalled CPU boards 22 are allowed to continue processing.

Figure 3:
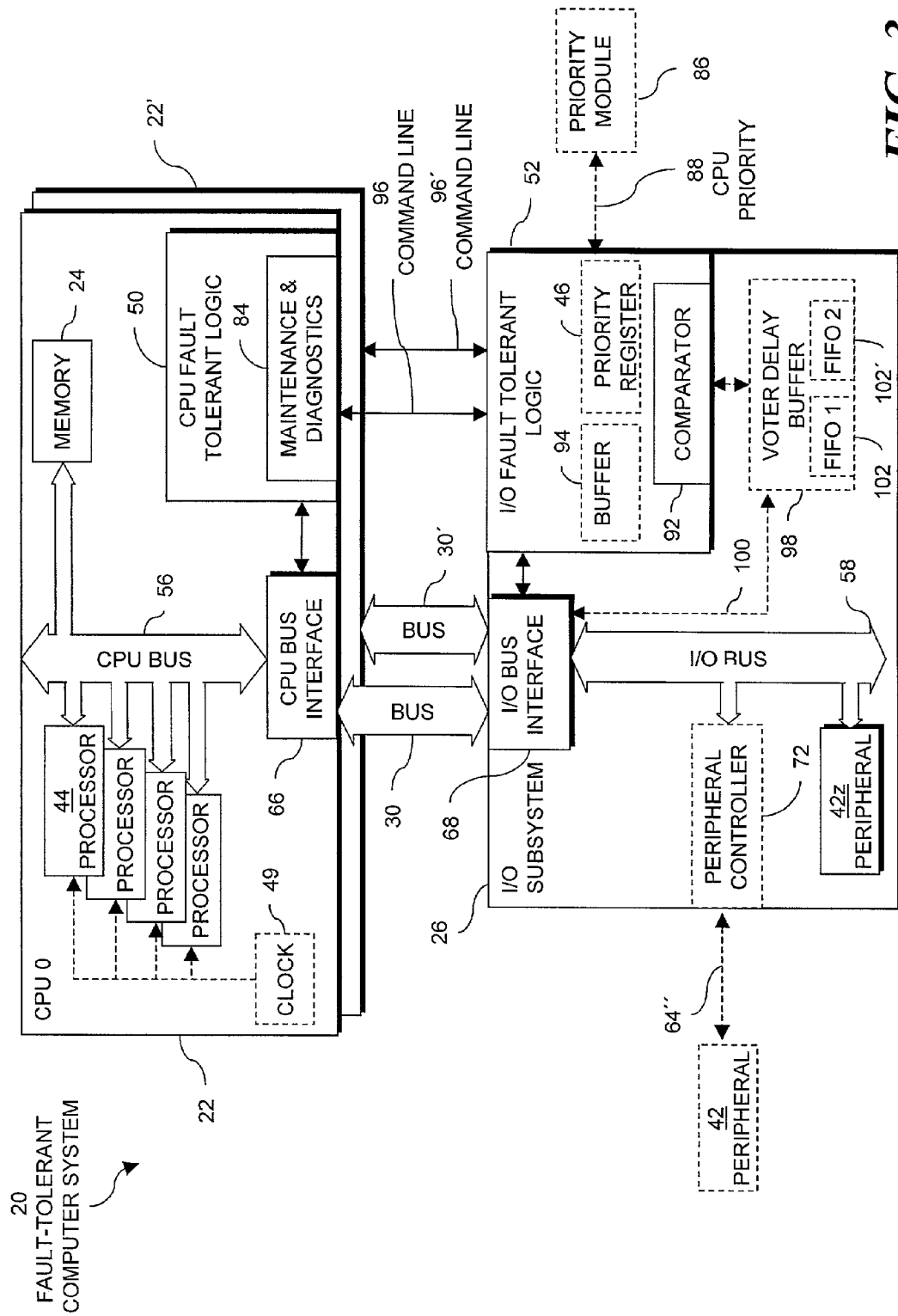
FIG. 3 is a more detailed block diagram of an embodiment of a fault-tolerant computer system.

In more detail and referring now to FIG. 3, one embodiment of a DMR fault-tolerant computer system 20 is shown. The fault-tolerant computer system 20 includes at least a first redundant CPU 22 and a second redundant CPU 22', a first and second communications channel 30 and 30', and at least one I/O subsystem 26. The redundant CPUs 22, 22' are in communication with the I/O subsystem 26 through the respective communications channel 30, 30'. The I/O subsystem 26 communicates with one or more peripheral devices 42z through the I/O bus 58, and optionally through the peripheral busses 64 as shown in FIG. 2. I/O instructions can be generated at each of the CPUs 22, or the peripheral devices 42, and can be directed at any of the other CPUs 22 or peripheral devices 42. The I/O instructions include memory read or writes, configuration read or writes, mass storage device read or writes, or other special instructions.

The I/O subsystem 26 includes an I/O bus 58 and I/O bus interface 68. The I/O bus 58 interconnects one or more of the peripheral devices 42 to the I/O bus interface 68. In some embodiments, the I/O subsystem 26 includes a peripheral controller 72 shown in phantom.

In one embodiment as described in detail below, the I/O subsystem 26 includes I/O fault-tolerant logic 52 and optionally a voter delay buffer 98, shown in phantom. In one embodiment, the I/O fault tolerant logic 52 communicates with the I/O bus interface 68 and the voter delay buffer 98, if present. In another embodiment, the I/O fault-tolerant logic 52 is implemented within the I/O bus interface 68, such as on a single application specific integrated circuit (ASIC).

The I/O fault tolerant logic 52 detects faults within the fault-tolerant computer system 20.

In one embodiment, the I/O fault-tolerant logic 52 includes a comparator 92 that performs comparisons of the I/O instruction streams. As previously described, for lock-step fault-tolerant embodiments, the CPU instructions are substantially identical where the same instructions occur for each of the redundant CPUs 22 on the same clock cycle. In some lockstep embodiments, voting of the I/O instructions from the CPU 22 is conducted during each clock cycle. In some embodiments, the I/O fault tolerant logic 52 compares the equivalent I/O instruction streams from each of the redundant CPUs 22 to identify a fault upon the detection of a miscompare.

In some embodiments the I/O fault-tolerant logic 52 also includes a buffer 94, shown in phantom. The buffer 94 can be used for holding I/O instructions from one or more of the redundant CPUs 22 in a loose-step fault-tolerant system 20. As previously described, the time of voting, or comparison, in a loose-step embodiment is determined by some event.

For either lock-step or loose-step embodiments, the I/O fault-tolerant logic 52 identifies errors when at least one of the inputs to the comparator 92 is different from the other equivalent, redundant inputs. In one embodiment, the comparator 92 substantially simultaneously performs a bit-by-bit comparison of the voted I/O instruction. When the comparator 92 determines it received input data from each of the redundant CPUs 22 that are identical at the time of voting, no errors are detected. In one embodiment, the redundant I/O instructions are stored in respective registers and voting occurs such that the equivalent bits of each register are compared by a plurality of comparators, one for each bit of the instruction.

The I/O fault-tolerant logic 52 provides the fault-tolerant computer system 20 with a fault-tolerant capability. In some embodiments, the I/O fault-tolerant logic 52 is implemented as a separate set of logic on the I/O subsystem 26. For example, the I/O fault-tolerant logic 52 may be provided as an ASIC, a field programmable gate array (FPGA), an electrically erasable programmable read-only memory (EEPROM), a programmable read-only memory (PROM), a programmable logic device (PLD), or a read-only memory device (ROM). The I/O fault-tolerant logic 52 compares the results of each operation performed by the separate CPU boards 22 to the results of the same operation performed on one of the other CPU boards 22', 22". If the I/O fault logic 52 determines a discrepancy then a failure has occurred.

As indicated above, the DMR fault-tolerant computer system 20 may include a priority module 86 (shown in phantom) and the voter delay buffer 98 (shown in phantom). In one embodiment, the I/O fault-tolerant logic 52 includes a priority register 46, also shown in phantom. In one embodiment, each CPU board 22 contains a CPU bus interface 66 and CPU fault-tolerant logic 50. The CPU fault-tolerant logic 50 communicates with the CPU bus interface 66. The priority register 46 of the I/O fault-tolerant logic 52 communicates with the priority module 86 through a CPU PRIORITY signal 88. In some embodiments, the CPU fault-tolerant logic 50 on each redundant CPU 22 communicates with the I/O fault-tolerant logic 52 through a respective command line 96, 96'.

In one embodiment of a fault-tolerant computer system 20, the priority module 86 assigns a priority to each of the redundant CPUs 22. The assigned priority is stored in the priority register 46. The I/O fault-tolerant logic 52 or the priority module 86 may update or change the assigned priority during operation. The priority can be established by a number of factors, such as historical performance of the CPU 22 or prior/current diagnostic results from the maintenance and diagnostics module 84.

As described above, in one embodiment of a lockstep system 20, the I/O fault-tolerant logic comparator 92 performs a bit-by-bit cycle compare procedure on the data output streams passing into the I/O subsystem 26 on the I/O busses 30 and 30'. In another embodiment of a loose-step system 20, the I/O subsystem 26 includes buffer 94, shown in phantom, before the comparator 92, to hold the transactions of the data output streams that will be compared from each of the redundant CPU boards 22. When each of the transactions to be compared from each of the respective redundant CPU boards 22 arrives at the buffer 94, the transactions are provided to the comparator 92. In either embodiment, lockstep or loose-stepped, the comparator 92 may be, for example, an XOR gate or any other known component for comparing two bit values. If the cycle-compare procedure detects a difference between the two data output streams, this may be an indication that one of the CPU boards 22 and 22' is malfunctioning. Accordingly, the I/O subsystem 26 responds by issuing a "STOP" command to both the first CPU 22 and the second CPU 22' over a first command line 96 and a second command line 96' respectively.

In one embodiment, the I/O fault tolerant logic 52 generates a command to take the suspected faulty CPU 22 off line. The command is communicated to the determined faulty CPU 22 over the respective command line 96. When voting results in a miscompare within a DMR system 20, additional information is required to determine which CPU 22 is faulty and should be taken off line.

In one embodiment, the I/O fault-tolerant logic 52 determines which of the two redundant CPUs 22 is faulty by requesting that the maintenance and diagnostics module 84 of each redundant CPU 22 perform diagnostics to verify the integrity of the respective CPU 22. In some embodiments, when a fault is detected, the DMR fault-tolerant system 20 restricts the propagation of faulty data by issuing a stop command to the CPUs 22 until diagnostics are completed, and by directing commands issued by the CPUs from the time of the issued faulty I/O instruction to the time that the stop command is executed by the CPUs 22. Once a fault is detected, the I/O instructions in the "pipeline" from each of the two redundant CPUs 22 are directed to a respective first and second first-in-first-out buffer (FIFO) buffer 102, 102' within the voter delay buffer 98. If one of the two CPUs, for example CPU 22, diagnoses a failure, that CPU 22 is taken off line for repair and replacement and any commands in the related FIFO 102 are discarded, whereas the commands associated with the "good" CPU 22' are reissued from the respective FIFO 102'.

In another embodiment, the I/O fault-tolerant logic 52 can determine which of the two redundant CPUs 22 is suspected faulty by defining the CPU 22 with the lower priority value stored in the priority register 46 as being the faulty CPU. In yet another embodiment, combinations of results from the maintenance and diagnostics modules 84 and the priority values can be used by the fault-tolerant logic 50, 52 to determine which CPU 22 is suspected faulty.

Figure 4:
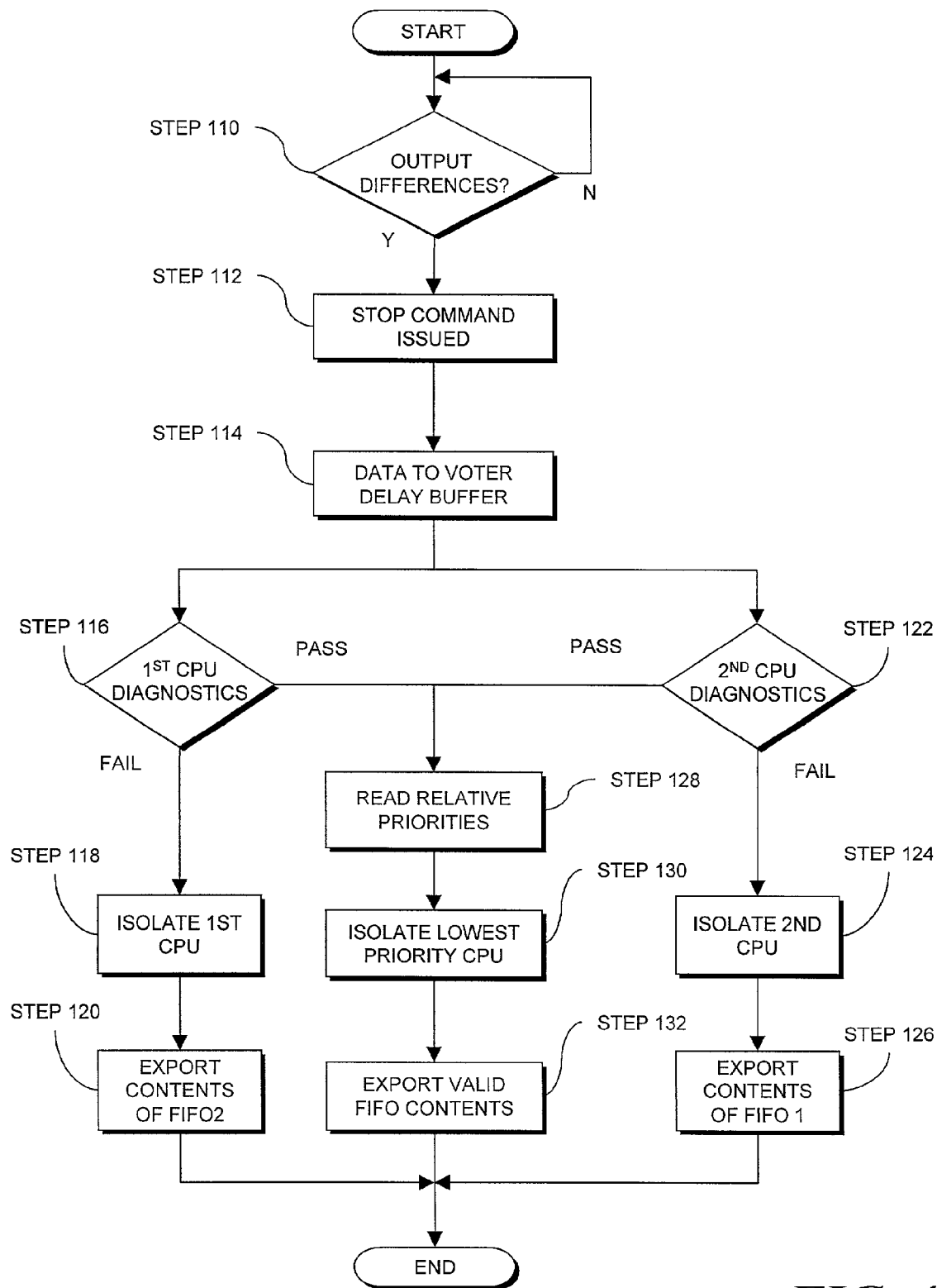
FIG. 4 is a flow diagram generally illustrating an embodiment of a process for handling errors in the fault-tolerant computer system shown in FIG. 2.

In operation, the fault-tolerant computer system 20 can best be described with reference to the flow diagram of FIG. 4. The data output streams on the I/O busses 30 and 30' are bit-by-bit compared by the comparator 92 (step 110) to provide a comparative reading from which it can be determined if there are differences between the monitored data output streams. If there are no such differences detected, the comparator 92 continues to monitor the data output streams. If the comparator 92 detects differences, the I/O fault-tolerant logic 52 issues a STOP command (step 112). In some embodiments, the issuance of a STOP command prompts the initiation of a CPU diagnostic procedure on each of the redundant CPUs 22 to check the status of each CPU 22. Subsequently, the data output streams on the I/O busses 30 and 30' are diverted to the voter delay buffer 98 (step 114).

The first CPU board 22 executes its ongoing diagnostic procedure (step 116). If the diagnosis indicates that the first CPU board 22 is malfunctioning, the first CPU board 22 is isolated (step 118) and operation of the computer system 20 continues with the second CPU board 22'. The data stored in the second FIFO buffer 102' is output over the system I/O bus 30 (step 120) and thereafter subsequently processed data from the second CPU board 22' is output over the system I/O bus 30.

Contemporaneously with the ongoing diagnosis procedure in the first CPU board 22 (step 116), the second CPU board 22 also executes its diagnostic procedure (step 122). If, on the other hand, the resulting diagnosis indicates that the second CPU board 22' is malfunctioning, the second CPU board 22' is isolated (step 124) and operation of the computer system 20 continues with the first CPU board 22. The data stored in the first FIFO buffer 102 is output over the system I/O bus 30 (step 126) and subsequent processed data from the first CPU board 22 is output over the system I/O bus 30.

If the diagnostic procedures fail to detect problems with either the first CPU board 22 or the second CPU board 22', the relative CPU priorities determined by the priority module 86 and maintained within the priority register 46 are used as the determinative factor. The relative CPU priorities are read from each of the priority registers 46, 46' to establish which of the first CPU board 22 or the second CPU board 22' has the higher priority (step 128). As discussed above, the relative priorities of the CPU boards 22 have been determined by one or more criteria, such as their operational histories or the comparative cumulative record of their internal error corrections. If the second CPU board 22' has been assigned the higher priority, for example, the computer system 20 selects the first CPU board 22 as the malfunctioning CPU board 22 and continues to operate with only the second CPU board 22' (step 130). In this event, the data stored in the second FIFO buffer 102' is output (step 132). On the other hand, if the first CPU board 22 has been assigned the higher priority, the computer system 20 selects the second CPU board 22' as the malfunctioning CPU board 22 and the operation of the computer system 20 continues with the first CPU board 22 (step 130). In this case, the data stored in the first FIFO buffer 102 is output (step 132).

One embodiment of a TMR fault-tolerant computer system 20 is similar to that shown in FIG. 2 with the internal detail of the CPU 22 and the I/O subsystem 26 shown in FIG. 3. In a TMR system, the I/O fault-tolerant logic 52 votes, or compares each of the input values of each I/O transaction generated by the three redundant CPUs 22 and received at the I/O bus interface 68 to determine if the three input instructions are not the same. In one embodiment, the voting constitutes a bit-by-bit comparison of each of the bits of the three redundant I/O instructions, performed within the comparator 92. Here, the comparison determines if all the inputs are the same or, conversely, if one of the inputs is different from the other and, from that, identifies which one of the three differs from the others. In one embodiment, the comparator 92 is implemented in hardware. In another embodiment, the comparator 92 includes combinatorial logic. In another embodiment, the comparator 92 is implemented in software. In one embodiment, when the comparator 92 determines a miscompare among the three input I/O instructions, the comparator 92 also identifies which of the three CPUs 22, referred to as the minority CPU 22, is not in agreement with the other two CPUs 22, referred to as the majority CPUs 22. Using the I/O fault-tolerant logic 52, the majority value is determined to be the correct valid instruction and the minority is determined to be faulty. The I/O fault tolerant logic 52 commands that the suspected faulty CPU 22 be taken off line.

In some embodiments of a TMR fault-tolerant system, there is no priority module 86 and no voter delay buffer 98 since identification of the faulty CPU 22 is determined to be the minority CPU in a triple-valued compare. In some embodiments of a TMR fault-tolerant computer system 20, the priority module and priority register 46 can also be used to make further determinations of identifying a failed CPU 22 in a miscompare. In other embodiments of a TMR fault-tolerant computer system 20 the maintenance and diagnostics module 84 and voter delay buffer 98 can also be used to make further determinations of identifying a failed CPU 22 in a miscompare. In yet other embodiments, the TMR fault-tolerant computer system 20 will function as the previously identified DMR fault-tolerant computer system 20 when one of the three CPUs 22 has been taken off-line, leaving two remaining on-line CPUs 22.

Figure 5:
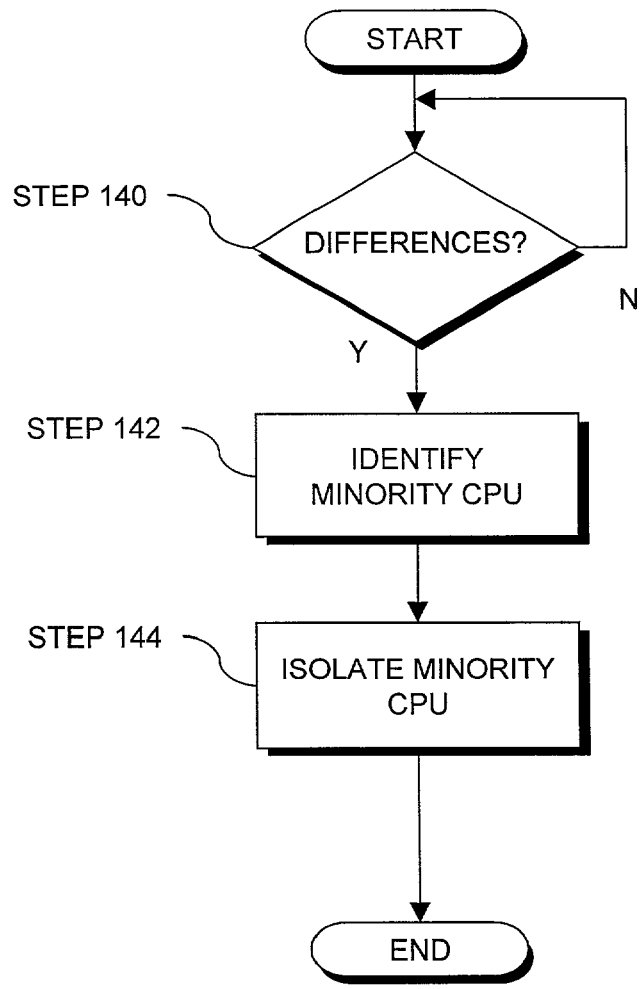
FIG. 5 is a flow diagram generally illustrating an embodiment of a process to identify and isolate a faulty CPU.

In operation, referring to FIG. 5, in one embodiment of a TMR fault-tolerant computer system 20, the I/O fault-tolerant logic 52 compares I/O transactions from each of the CPU boards 22, 22', 22" (step 140). In the TMR system 20, the I/O fault-tolerant logic comparator 92 performs a voting function by comparing each of the instruction streams by a bit-by-bit comparison and identifying a minority CPU board 22 that produces an I/O instruction stream that does not match the I/O instruction stream from the majority (step 142)—the other two CPU boards 22', 22" in a TMR system. The minority CPU board 22 is then taken off-line to avoid the propagation of errors into the system and to allow for diagnostics, repair and replacement of the identified minority CPU board 22 if necessary (step 144).

Discussing the operation in further detail, when the I/O fault-tolerant logic 52 issues a STOP command in response to the detection of a miscompare, the I/O subsystem 26 stops transmitting output data on the I/O bus 58 and routes the data output streams on the busses 30 and 30' to a voter delay buffer 98 via a delay buffer line 100. Specifically, the data received from the first CPU board 22 is sent to a first FIFO buffer 102, and the data received from the second CPU board 22' is sent to a second FIFO buffer 102'. This action prevents the peripheral devices from being sent data which may have been corrupted by the malfunctioning CPU board 22, and also saves data which otherwise may have been lost or discarded while the malfunctioning CPU board 22 was being identified. In one embodiment, the fault-tolerant logic 50, 52 identifies a faulty CPU 22 and notifies the voter delay buffer which CPU 22 is faulty. The voter delay buffer 98 then releases the buffered commands from the respective FIFO 102, 102' for the valid CPU 22 and normal processing continues.

In a preferred embodiment, the maintenance and diagnostic subsystems 84 and 84' continually run their respective diagnostic procedures. It should be understood that, even after the STOP command has been issued to the CPU boards 22 and 22', the I/O subsystem 26 continues to forward input data streams sent by the peripheral devices to the CPU boards 22 and 22'. The CPU boards 22 and 22' continue to process the data while running the diagnostic procedures, in accordance with normal operational procedures. Thus, from the point of view of the peripheral devices, the fault-tolerant computer system 20 functions normally.

Figure 6:
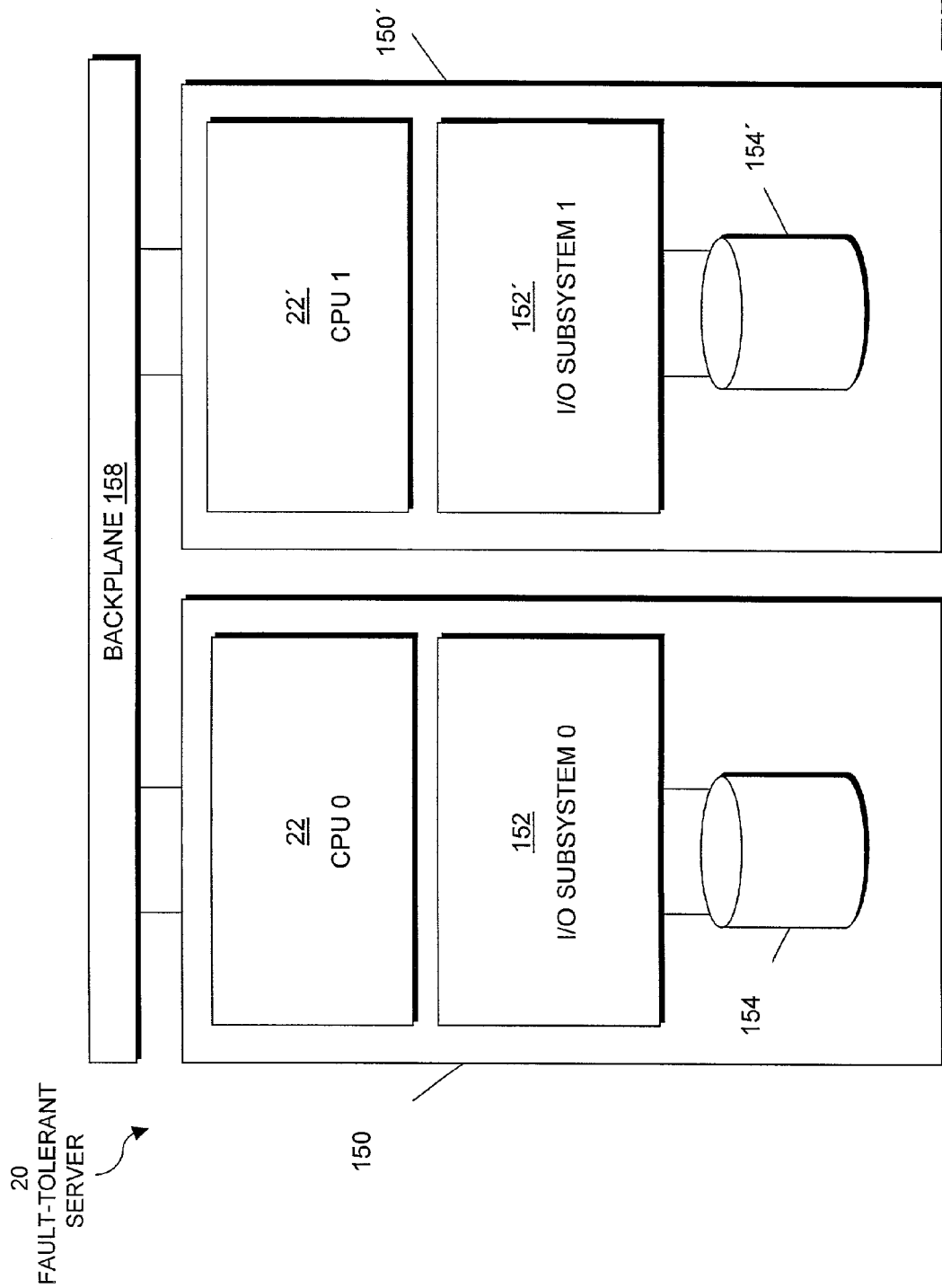
FIG. 6 is a block diagram of an embodiment of a fault-tolerant server.

Referring to FIG. 6, another embodiment of the fault-tolerant computer system 20, also referred to below as a fault-tolerant server, is illustrated. The fault-tolerant server 20 includes a first computing element 150 and a second computing element 150' (generally 150). In one embodiment, each computing element 150 is an independent motherboard that includes the CPU board 22 of FIG. 2 and FIG. 3 and a "local" I/O subsystem 152, 152' (generally 152). As used above and below, a "local" I/O subsystem 152 is an I/O subsystem that is associated with a particular CPU board 22.

Each computing element 150 also includes a "local" mass storage device 154, 154' (generally 154). As used above and below, a "local" mass storage device 154 is a mass storage device that is associated with a local I/O subsystem, and thus associated with a particular CPU board 22 and computing element 150. In one embodiment, each respective local mass storage device 154 is located on the same board as the respective computing element 150. In another embodiment, the local mass storage device 154 is an external component of the computing element 150.

The local mass storage device 154 also has a disk controller (not shown) associated with the mass storage device 154 and with the particular computing element 150. In one embodiment, the disk controller is implemented in the local I/O subsystem 152. In another embodiment, the disk controller is implemented as an independent component in communication with the I/O subsystem 152 and the local mass storage device 154.

If a fault-tolerant server includes two independent computing elements that include devices local to the computing element (i.e., a local I/O subsystem and a local mass storage device), each CPU board typically does not have access to each local I/O subsystem and each mass storage device, unlike the fault-tolerant computer system 20 of FIG. 2. Thus, a typical fault-tolerant server having two independent computing elements cannot use a first CPU board located on the first computing element to access a mass storage device located on the second computing element.

To enable one of the CPU boards 22 to access a mass storage device 154 that is local to the other CPU board 22, the fault-tolerant server 20 additionally includes a backplane 158. In general, a backplane is a circuit board or framework that supports other circuit boards, devices, and the interconnections among devices, and provides power and data signals to supported devices. A computer system may also have expansion cards plugged into sockets of a backplane to increase the capabilities of the computer system. Backplanes are often described by those skilled in the art as being either "active" or "passive". Active backplanes contain, in addition to the sockets, logical circuitry that performs computing functions. In contrast, passive backplanes contain almost no computing circuitry.

In particular, the backplane 158 enables one computing element 150 and, more particularly, one CPU board 22 to access either local I/O subsystem 152, 152' and thus either mass storage device 154, 154' even though the mass storage devices 154, 154' are local to one computing element 150, 150'. In one embodiment, the computing elements 150 generally plug into a socket in the backplane 158, thereby facilitating the swapping of one computing element 150 with another computing element 150' (e.g., replacing a computing element 150 upon a failure).

Figure 7:
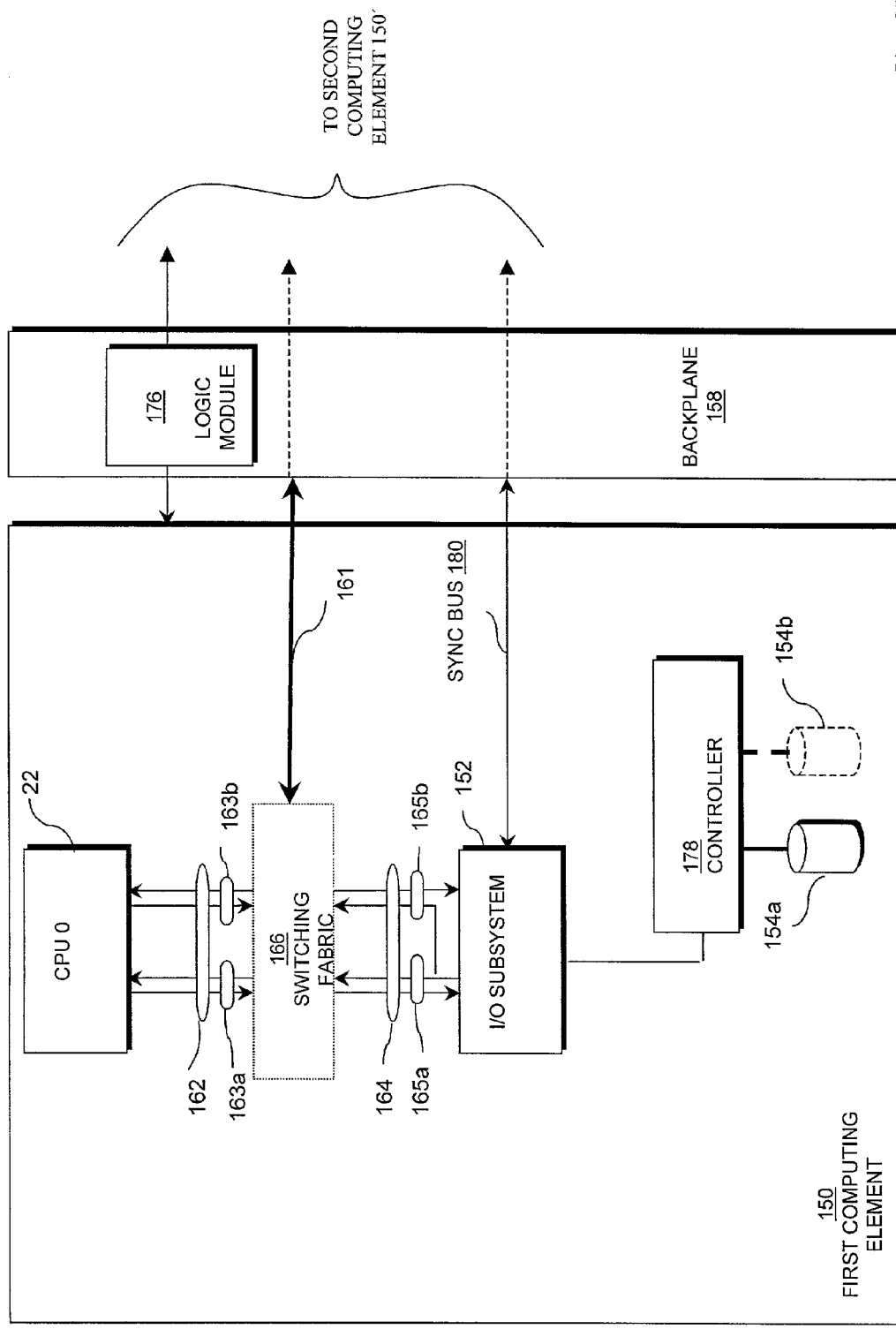
FIG. 7 is a block diagram of a computing element of the fault-tolerant server of FIG. 6.

In more detail and also referring to FIG. 7, each CPU board 22, 22' communicates with its respective local I/O subsystem 152, 152' over a communications link. To communicate with the respective local I/O subsystem 152, the communications link includes a first communications channel 162, 162' (162' not shown) (generally 162), a switching fabric 166, 166' (166' not shown) (generally 166), and a second communications channel 164, 164' (164' not shown) (generally 164). To communicate with the local I/O subsystem 152 located on the opposite computing element 150, the communications link also includes a backplane 158 and a respective backplane link 161, 161' (generally 161).

In one embodiment, the communications link or some or all of the components that make up the communications link (e.g., the communications channel 162, 164, each backplane link 161) are standard system busses such as those described for the computer system 20 illustrated in FIG. 1 (ISA, VESA, EISA, MCA, PCI, and the like). In other embodiments, the communications link or some or all of the components that make up the communications link may be a "twisted-pair" cable, coaxial cable, fiber optic cable, or wireless links, such as radio links or free-optics links.

In one embodiment, the first CPU board 22 communicates with the first switching fabric 166 over a first communications line 163a. The first CPU board 22 communicates with the second computing element 150' (i.e., the second switching fabric 166') over a second communications line 163b, the first backplane link 161, the backplane 158, and the second backplane link 161'. The first switching fabric 166 communicates with the first local I/O subsystem 152 over a third communications line 165a. The first switching fabric 166 communicates transmission received from the second computing element 150' to the first local I/O subsystem 152 over the fourth communications line 165b.

Similarly, the second CPU board 22' (not shown) communicates with the second switching fabric 166' (not shown) over a first communications line 163a' (not shown). The second CPU board 22' communicates with the first computing element 150 (i.e., the first switching fabric 166) over a second communications line 163b' (not shown), the second backplane link 161' (not shown), the backplane 158, and the first backplane link 161. The second switching fabric 166' communicates with the second local I/O subsystem 152' (not shown) over a third communications line 165a'. The second switching fabric 166 communicates transmission received from the first computing element 150 to the second local I/O subsystem 152' over the fourth communications line 165b' (not shown).

It should be noted that the first communications lines 163a, 163a' (generally 163a), the second communications lines 163b, 163b' (generally 163b), the third communications lines 165a, 165a' (generally 165a), and/or the fourth communications lines 165b, 165b' (generally 165b) may each be, in one embodiment, a standard system bus such as those described for the computer system 20 illustrated in FIG. 1 (ISA, VESA, EISA, MCA, PCI, and the like). In other embodiments, the communications lines 163a, 163b, 165a, 165b may be a "twisted-pair" cable, coaxial cable, fiber optic cable, or wireless links, such as radio links or free-optics links.

In some embodiments, the backplane 158 includes an active logic module 176. In certain of these embodiments, the logic module 176 provides the computing elements 150 with system information required on power-up, such as the system identification number, or system ID. For example, the logic module 176 provides the first CPU board 22 with a system ID of 0 (i.e., CPU 0) and provides the second CPU board 22' with a system ID of 1 (i.e., CPU 1). Additionally, the logic module 176 may provide a common clock source to the CPU boards 22 on each computing element 150.

The backplane 158 may include a connector interface (not shown) that facilitates the physical and electrical connection of the server 20 to external resources. In some embodiments, the connector interface is an external interface that provides a connection to an external network via, for example, an RJ-45 connector or coaxial cable connection. Similarly, the external connector interface may connect to an external modem of the fault-tolerant server 20 and thus provides a network connection to the internet. The connector interface can also connect to one or more peripheral devices, such as a keyboard or mouse via, for example, a DB-9 connector, a DB-25 connector, or a USB port. In certain embodiments, the external connector interface facilitates "blind mating" between the backplane 158 and the computing elements 150. That is, the computing elements 150 need only make connection with the backplane 158 in order to have access to all network and external physical resources. In other embodiments, the connector interface is internal to the computing element 150.

Each computing element 150 also includes a mass storage device controller 178 (also referred to throughout as a disk controller) to interface with the local mass storage device 154. In some embodiments, the local mass storage device 154 is a disk drive capable of communicating using the Fibre Channel protocol (i.e., "Fibre Channel disks"). In another embodiment, each computing element 150 includes multiple local mass storage devices (e.g., a first local mass storage device 154a and a second local mass storage device 154b) that communicate with the mass storage device controller 178.

For embodiments in which Fibre Channel disks 154 are provided, the disks 154 may be connected in a loop topology with the I/O subsystem 152. This arrangement is generally referred to as a Fibre Channel Arbitrated Loop (FC-AL). As is well known for FC-ALs, an I/O subsystem may communicate with multiple FC-ALs. For example, the first local I/O subsystem 152 may directly communicate with the disk drives 154 present on the first FC-AL and may also directly communicate with the remote disk drives 154 present on the remote FC-AL. This communication from one I/O subsystem 152 to either or both FC-ALs may be useful when one of the local I/O subsystems 152 fails because the other local I/O subsystem 152 can communicate with the FC-AL 154 associated with the failed local I/O subsystem 152 to continue normal operation.

In certain embodiments, the communication between the I/O subsystem 152 and the FC-AL is through the backplane 158. In other embodiments, the I/O subsystem 152 communicates directly with the remote FC-AL using a very high density metric (VHDM) connector (not shown). In a further embodiment, a subset of the connector pins in the VHDM connector provides electrical communication between the I/O subsystem 152 and the remote FC-AL. Additionally, another subset of the connector pins of the VHDM connector routes the switching fabric 166 located on one computing element 150 to the switching fabric 166 located on the other computing element 150.

Each computing element 150 also includes an I/O synchronization bus, or sync bus, 180. The sync bus 180 communicates with the backplane 158 and enables synchronization of all of the local I/O subsystems 152. In one embodiment, the sync bus 180 synchronizes state information about each CPU board 22 between the local I/O subsystems 152. The state information of a CPU board 22 described above includes, for example, if the CPU board 22 is an "on-line" CPU board 22 (i.e., operating correctly), a "broken" CPU board 22 (i.e., operating incorrectly), or an "offline" CPU board 22 (i.e., executing diagnostics or ready to be brought into service).

It should be noted that, although the description above with respect to FIG. 7 may describe the first computing element 150, the second computing element 150' includes the same components as the first computing element 150 and the description applies to the second computing element 150 as well with minor modifications.

Figure 8:
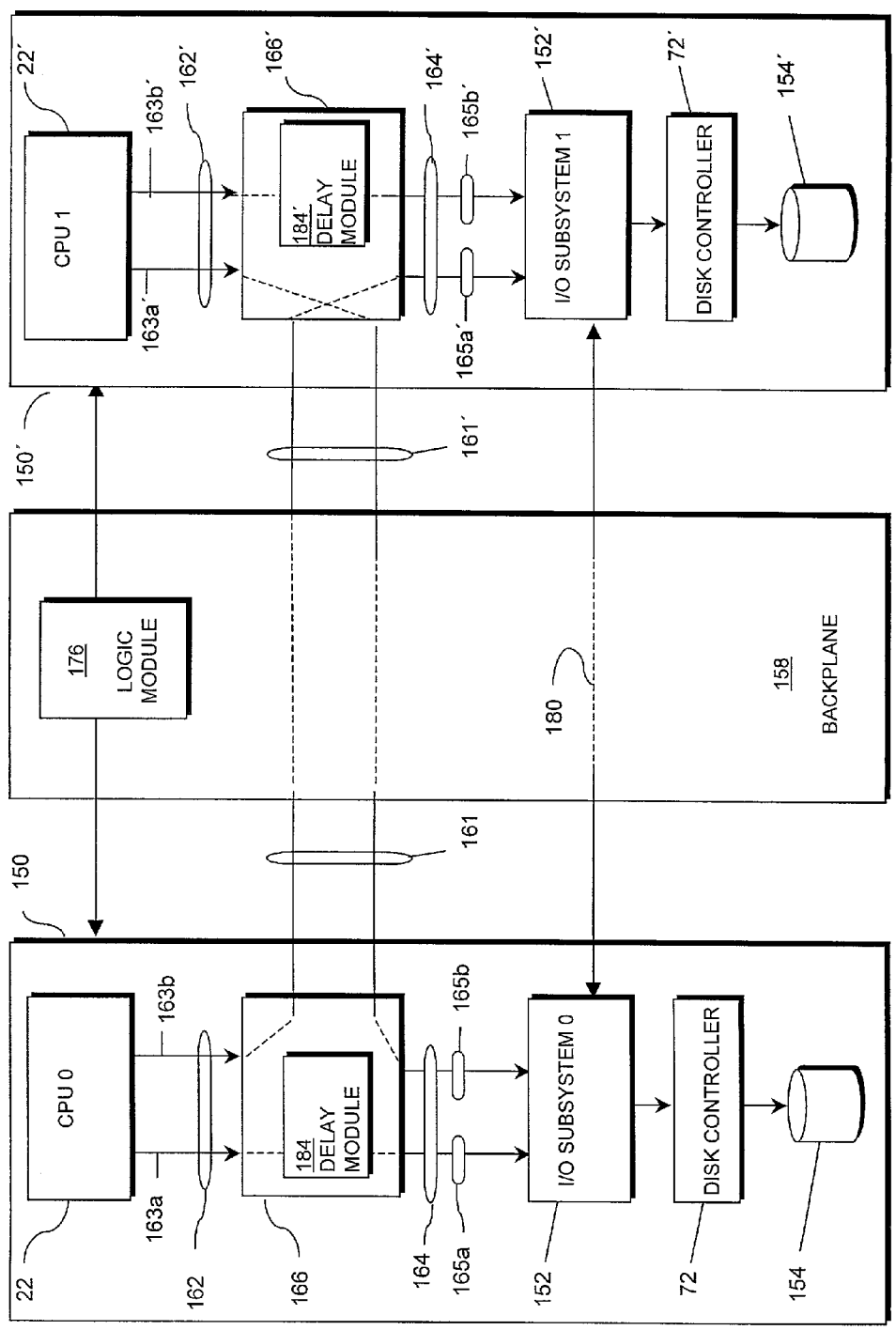
FIG. 8 is a more detailed block diagram of the fault-tolerant server of FIG. 6.

Referring to FIG. 8, each local I/O subsystem 152 (i.e., the I/O fault tolerant logic 52 described above) detects faults within the fault-tolerant server 20 by comparing each of the instruction streams that each CPU board 22 produces. The switching fabric 166 used in conjunction with the backplane 158 enables synchronization of each local I/O subsystem 152 in the reception of the I/O instruction streams provided by each CPU board 22. In one embodiment, the switching fabric 166 uses the system ID described above to determine which communications line (e.g., first communications line 163a, second communications line 163b) to route to the backplane link 161 (i.e., to the backplane 158) and which communications line (e.g., first communications line 163a, second communications line 163b) to route to the local I/O subsystem 152 that is located on the same computing element 150 as the switching fabric 166.

In particular and as shown in FIG. 8, the first switching fabric 166 provides a communications path between the first CPU board 22 and the first local I/O subsystem 152 using the first communications line 163a and the third communications line 165a of the first communications channel 162. The first switching fabric 166 also provides a communications path connecting the first communications line 163a to a first delay module 184. Data, e.g., I/O instructions, are delayed by the delay module 184 prior to transmission of the data to the first local I/O subsystem 152.

The first switching fabric 166 also provides a communications path between the first CPU board 22 and the second local I/O subsystem 152' on the second computing element 150' using the second communications line 163b of the first communications channel 162 and the first backplane link 161. The first switching fabric 166 routes all I/O instructions transmitted on the second communications line 163b to the second local I/O subsystem 152' through the backplane 158.

Similarly, the second switching fabric 166' provides a communications path between the second CPU board 22' and the second local I/O subsystem 152' using the second communications line 163b' of the first communications channel 162'. The second switching fabric 166' also provides a communications path from the second communications line 163b' to a second delay module 184' where data is held prior to transmission to the second local I/O subsystem 152'. The first and second delay modules 184, 184' (generally 184) are described in greater detail below.

The second switching fabric 166' provides a communications path between the second CPU board 22' and the first local I/O subsystem 152 using the first communications line 163a' of the first communications channel 162'. The second switching fabric 166' routes all I/O instructions transmitted on the first communications line 163a' to the first local I/O subsystem 152 through the backplane 158.

Figure 9:
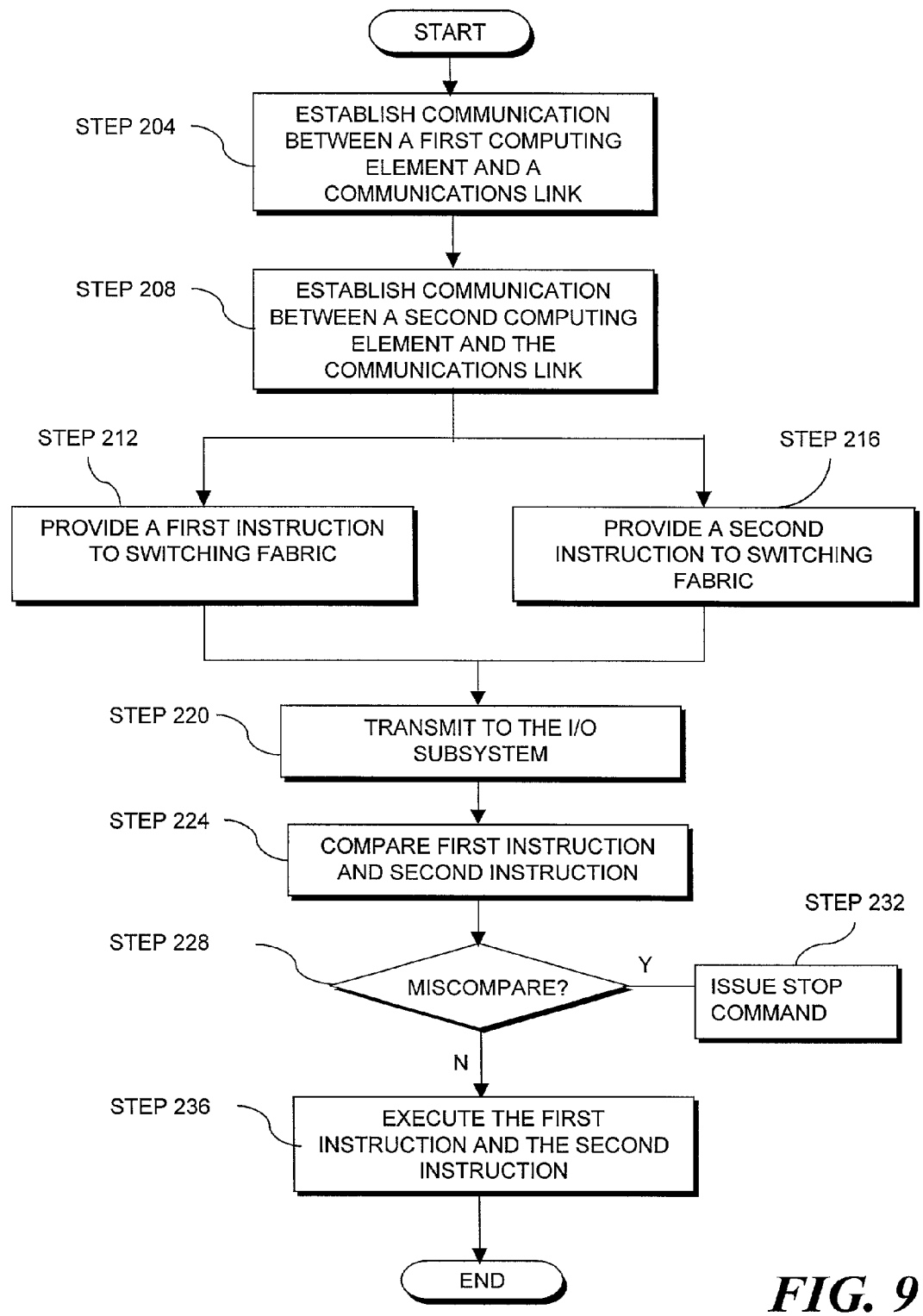
FIG. 9 is a flow diagram illustrating an embodiment of a process to compare instructions generated by each computing element of the fault-tolerant server of FIG. 6.

To insure that the first CPU board 22 and the second CPU board 22' generate identical instruction streams and therefore execute in lockstep operation and also referring to FIG. 9, the local I/O subsystem 152 that receives the I/O instructions from the CPU boards 22 compares each I/O instruction. To enable such a comparison, the fault-tolerant server 20 establishes (step 204) communication between the first computing element 150 and the communications link described above. Similarly, the fault-tolerant server 20 establishes (step 208) communication between the second computing element 150' and the communications link. In particular, the computing element 150 establishes communications between the CPU board 22 and the first and second local I/O subsystems 152, 152' using the communication paths that the switching fabric 166 and the backplane 158 provides to each CPU board 22, as described above.

In one embodiment, the first CPU board 22 establishes communications between the local I/O subsystems 152 by transmitting a test message to the first local I/O subsystem 152 and the second local I/O subsystem 152' over the first switching fabric 166, the backplane link 161, the backplane 158, the backplane link 161', and the second switching fabric 166'. Once the first local I/O subsystem 152 and the second local I/O subsystem 152' each receives the particular test message, the first local I/O subsystem 152 and the second local I/O subsystem 152' each transmit a response message to the first CPU board 22. In one embodiment, each response message identifies the local I/O subsystem 152 that sends the response message to the CPU board 22. In some embodiments, the response message includes the system ID for the computing element 150 which transmitted the response message.

Once a communications link is established to each local I/O subsystem 152, in one embodiment the first CPU board 22 then generates (step 212) a first I/O instruction, such as to store a datum in the first local mass storage device 154. In another embodiment, the first CPU board 22 receives the first I/O instruction from a peripheral device 42 (shown in FIG. 3), such as a modem. The first CPU board 22 transmits the I/O instruction (e.g., "store datum") to the first switching fabric 166 over the first communications line 163a.

As the two computing elements 150 are executing in lockstep, the second computing element 150' simultaneously generates (step 216) (or receives from a peripheral device 42) a second I/O instruction that is identical to the first instruction (e.g., to store a datum in the first local mass storage device 154). The second CPU board 22' transmits the I/O instruction to the second switching fabric 166' over the first communications line 163a'. The first switching fabric 166 and the second switching fabric 166' then transmit (step 220) the first I/O instruction and the second I/O instruction, respectively, to the first local I/O subsystem 152. More specifically, the second switching fabric 166' transmits in step 220 the second I/O instruction to the first local I/O subsystem 152 via the first communications line 163a' and the backplane 158.

Transmission of I/O instructions to the opposite computing element 150 over the backplane 158 results in an intrinsic delay in the reception of the instruction by the receiving I/O subsystem. As described above, the local I/O subsystems 152 have to concurrently compare the instructions that each CPU board 22 generates to ensure that each CPU board 22 is operating in lockstep. Thus, to compensate for the inherent delay in the transmission to the other computing element 150, each switching fabric 166 delays the transmission of the I/O instruction to the local I/O subsystem 152 (located on the same computing element 150 as the switching fabric 166) with the delay module 184 noted above. In one embodiment, the delay module 184 is tuned to the backplane 158 so that the delay module 184 provides a delay that is equivalent to the amount of time an instruction takes to reach the local I/O subsystem 152 on the opposite computing element 150.

Once the first local I/O subsystem 152 receives the first and second I/O instructions, the fault-tolerant logic module 52 (not shown) of the first local I/O subsystem 152 uses the comparator 92 (shown in FIG. 3) described above to compare (step 224) the first and second I/O instructions (e.g., bit by bit comparison). If the I/O fault-tolerant logic module 52 on the first computing element 150 determines (step 228) that differences exist between the first instruction and the second instruction, the first local I/O subsystem 152 issues (step 232) a "STOP" command to both the first CPU board 22 and the second CPU board 22'. In particular, the first local I/O subsystem 152 transmits the "STOP" command to the first switching fabric 166 over the third communications line 165a and then to the first CPU board 22 over the first communications line 163a. To transmit the "STOP" command to the second CPU board 22', the first local I/O subsystem 152 transmits the "STOP" command to the second switching fabric 166' over the fourth communications line 165b, the first backplane link 161, the backplane 158, and the fourth communications line 165b'. If the first local I/O subsystem 152 does not detect differences in step 224, the first local I/O subsystem 152 executes (step 236) the I/O instruction, such as by storing the datum in the first local mass storage device 154.

Additionally, in one embodiment the fault-tolerant server 20 detects errors in communications that the communications channel 162, the backplane 158, the local mass storage devices 154, the local I/O subsystems 152, and/or the second communications channel 164 introduce. In one embodiment, each CPU board 22 introduces a parity bit to the I/O instructions. In a further embodiment, each local I/O subsystem 152 and/or each local mass storage devices 154 also introduces a parity bit to any communication to either computing element 150. The communications channel 162, 164 performs parity checking on any incoming instruction stream (e.g., from either CPU board 22, from either switching fabric 166, from the backplane 158).

More specifically and in one embodiment, the first switching fabric 166 performs parity checking on the first I/O instruction when the switching fabric 166 receives the instruction from the first communications line 163a. Similarly and in further embodiments, the first switching fabric 166 performs parity checking on the second I/O instruction upon reception of the second I/O instruction from the backplane 158. If the first switching fabric 166 detects a parity error in the second I/O instruction, the switching fabric 166 alerts the CPU board 22 that the backplane 158 may be faulty (assuming no other error discovered in prior parity checks of the communication of the second I/O instruction before reaching the first switching fabric 166). Thus, in one embodiment the error detection enables the fault-tolerant server 20 to isolate faults of a CPU board 22, the backplane 158, or the switching fabric 166. Besides parity checking (e.g., even parity, odd parity), the fault-tolerant server 20 may support other protocols for ensuring transmission accuracy, such as, without limitation, Microcom Networking Protocol (MNP), V.42, Hamming coding, and the like.

In another embodiment, the first CPU board 22 provides a first I/O instruction to read a datum from the first local mass storage device 154. As the second CPU board 22' is executing in lockstep with the first CPU board 22, the second CPU board 22' provides a second I/O instruction to read the datum from the first local mass storage device 154.

In this embodiment, the first I/O subsystem 152 accesses the datum from the first local mass storage device 154 and transmits the datum to each CPU board 22. More specifically and in one embodiment, the first local I/O subsystem 152 transmits the datum to the second CPU board 22' over the backplane 158.

In one embodiment, mirroring software updates the contents of one of the local mass storage devices 154 (e.g., the second local mass storage device 154') so that the contents are identical to the contents of the other local mass storage device 154 (e.g., the first local mass storage device 154). In other words, the second local mass storage device 154' "mirrors" the first local mass storage device 154.

Although the description above and below may focus on the first computing element 150 and the components therein (e.g., the first CPU board 22, the first local I/O board 152), it should be clear that the description also applies to additional computing elements 150 (e.g., the second computing element 150') and the respective components therein (e.g., the second CPU board 22', the second local I/O subsystem 152').

Figure 10:
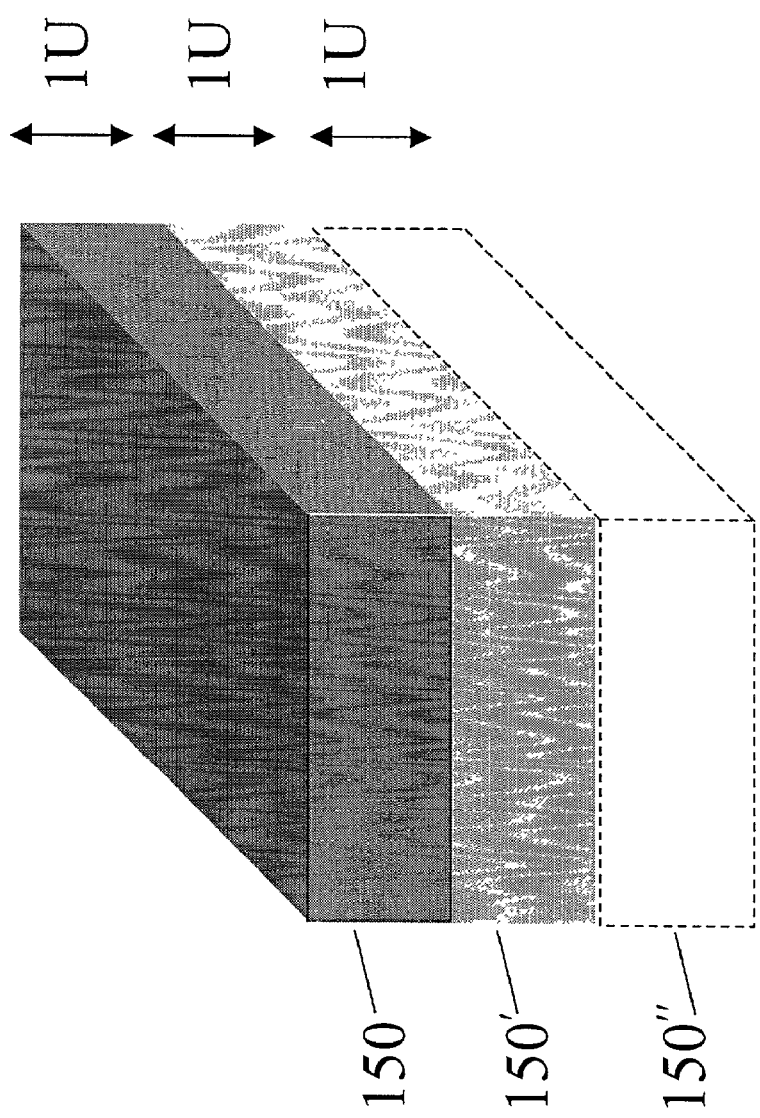
FIG. 10 is a block diagram of the fault-tolerant server of FIG. 6 mounted in a cabinet fashion.

Referring to FIG. 10, the fault-tolerant server 20 may be organized in a cabinet fashion, with each computing element 150 being a 1U rack-mounted motherboard. In general, a rack-mounted motherboard is a motherboard that is built for installation in a metal frame or cabinet of standard width (typically 19 inches or 23 inches) and mounting arrangements. In general, a "U" as used above is a standard unit of measure for designating the height in computer enclosures and rack cabinets. In one embodiment, a U equals 1.75 inches. For example, a 4U chassis is 7 inches high and a 40U rack cabinet is 70 inches high.

As shown in FIG. 10, the fault-tolerant server 20 includes two 1U rack-mounted motherboards 150; thus the fault-tolerant server 20 is a 2U server. Although described as a 2U fault-tolerant server 20, it should be noted that the fault-tolerant server 20 can use any number of 1U rack-mounted motherboards 150 (e.g., the third computing element 150" shown in shadow). In other embodiments, the rack-mounted motherboards 150 may be any reasonable height (e.g., 1U, 2U, 3U, 4U).

Having shown the preferred embodiments, one skilled in the art will realize that many variations are possible within the scope and spirit of the claimed invention. It is thus the intention to limit the invention only by the scope of the claims.

What is claimed is:

1. A fault-tolerant server comprising:
    (a) a communications link;
    (b) a first Central Processing Unit, (CPU), in electrical communication with the communications link and capable of transmitting a first information stream;
    (c) a second CPU, in electrical communication with the communications link and capable of transmitting a second information stream;
    (d) a first Input/Output (I/O) subsystem, in electrical communication with the first CPU, the second CPU and the communications link, configured to compare the first information stream and the second information stream;
    (e) a second Input/Output (I/O) subsystem in electrical communication with the first CPU, the second CPU and the communications link, configured to compare the first information stream and the second information stream;
    (f) a first local mass storage device in electrical communication with both the first CPU and the second CPU, and
    (g) a second local mass storage device in electrical communication with both the first CPU and the second CPU,
    wherein the first I/O subsystem is configured to selectively access the first local mass storage device based upon its comparison of the first and second information streams.

2. The fault-tolerant server of claim 1, wherein the second I/O subsystem is configured to selectively access the second local mass storage device based upon its comparison of the first and second information streams.

3. The fault-tolerant server of claim 2 wherein the first CPU can access the second local mass storage device through the second I/O subsystem.

4. The fault-tolerant server of claim 2 wherein the communications link further comprises a first switching fabric in electrical communication with the first CPU.

5. The fault-tolerant server of claim 4 wherein the first switching fabric is in electrical communication with both the first I/O subsystem and the second I/O subsystem.

6. The fault-tolerant server of claim 5 wherein a second switching fabric is in electrical communication with the second CPU, the first I/O subsystem and the second I/O subsystem.

7. The fault-tolerant server of claim 2 wherein each switching fabric further comprises a delay module to buffer and delay transmission of at least one of the first and second information streams.

8. The fault-tolerant server of claim 2, wherein the first local mass storage device is located on a same motherboard as the first CPU.

9. The fault-tolerant server of claim 2, wherein each I/O subsystem is configured to issue a stop command to at least one of the first and the second processors upon detecting a discrepancy between the first and second information streams.

10. The fault-tolerant server of claim 1 wherein the communications link comprises a backplane.

11. The fault-tolerant server of claim 10 wherein the communications link further comprises a backplane link in communication with the backplane.

12. The fault-tolerant server of claim 1 wherein the first CPU and the second CPU further comprise a 1U rack-mount motherboard.

13. A method for storing data in a fault-tolerant server, the method comprising the steps of:
    (a) establishing communication between a first CPU, a communications link, a first I/O subsystem and a second I/O subsystem;
    (b) establishing communication between a second CPU, the communications link, the first I/O subsystem and the second I/O subsystem;
    (c) at each of the first and second I/O subsystems, comparing information streams transmitted by the first and the second CPUs over the communications link;
    (d) if the information streams are determined to be different by either the first I/O subsystem or the second I/O subsystem, issuing a stop command;
    (e) otherwise, storing data from the information stream on both a first mass storage device local to the first I/O subsystem and a second mass storage device local to the second I/O subsystem; and (f) if the first CPU fails, allowing the second CPU to access the first mass storage device through the first I/O subsystem.

14. The method of claim 13 further comprising:
(g) if the second CPU fails, allowing the first CPU to access the second mass storage device through the second I/O subsystem.

15. The method of claim 13 further comprising the step of allowing either CPU to access both the first and the second mass storage devices.

16. The method of claim 15 wherein the first CPU may only access the second mass storage device upon the failure of the first mass storage device.

17. The method of claim 13 further comprising the step of communicating with a 1U rack-mount motherboard.

18. The method of claim 13 wherein the first I/O-subsystem and the second I/O subsystem are connected via a switching fabric.

19. The method of claim 13 further comprising the step of buffering and delaying first and second information streams.

20. The method of claim 13 further comprising the step of executing instructions on the second CPU in lockstep with the first CPU.

21. An apparatus for accessing at least one of a first local mass storage device and a second local mass storage device in a fault-tolerant server, the apparatus comprising:

(a) a means for establishing communication between a first CPU and a first local mass storage device capable of transmitting a first information stream;

(b) a means for establishing communication between a second CPU and a second local mass storage device capable of transmitting a second information stream;

(c) a first Input/Output (I/O) subsystem means, in communication with the first CPU and the first local mass storage device, configured to compare the first information stream and the second information stream;

(d) a means for accessing, by the first I/O subsystem, the first local mass storage device in response to a comparison of the first and second information streams;

(e) a means for directly accessing, by the first CPU, the second local mass storage device in the event of a failure of the first local mass storage device.

* * * * *